United States Patent [19]

Baran et al.

[11] Patent Number: 4,509,073
[45] Date of Patent: Apr. 2, 1985

[54] TWO-WAY CABLE-TELEVISION SYSTEM

[75] Inventors: Paul Baran, Menlo Park; Maarten R. Pranger, Morgan Hill, both of Calif.

[73] Assignee: Packet Technologies, Inc., Cupertino, Calif.

[21] Appl. No.: 373,048

[22] Filed: Apr. 29, 1982

[51] Int. Cl.³ .............................................. H04N 7/10
[52] U.S. Cl. ........................................ 358/86; 370/94; 455/5
[58] Field of Search ...................... 370/60, 94; 358/84, 358/86; 455/2, 3, 4, 5

[56] References Cited

U.S. PATENT DOCUMENTS

| | | | |
|---|---|---|---|
| 3,934,079 | 1/1976 | Barnhart | 455/2 |
| 4,002,843 | 1/1977 | Rackman | 455/5 |
| 4,168,400 | 9/1979 | de Couasnon et al. | 370/94 |
| 4,395,780 | 7/1983 | Gohm | 358/86 |

OTHER PUBLICATIONS

Tobagi-Multiaccess Protocols in Packet Communication Systems-IEEE Trans. on Comm., vol. COM-28, No. 4, Apr. 1980, pp. 468-488.

Primary Examiner—Joseph A. Orsino, Jr.
Attorney, Agent, or Firm—Townsend & Townsend

[57] ABSTRACT

A two-way (interactive) cable television system is disclosed which has distributed processing and which employs a cable-distribution subsystem that includes corrective regenerators each of which ignores noise (invalid signals) and, when overloaded, ignores (rejects) certain valid signals so as to favor older information (commands).

4 Claims, 1 Drawing Figure

TWO-WAY CABLE-TELEVISION SYSTEM

BACKGROUND OF THE INVENTION

1. Field of the Invention

The present invention relates to cable television generally and more particularly to a two-way (interactive) cable-television system having distributed processing and means for regulating the upstream signal flow.

2. Description of the Prior Art

Cable television, also referred to as community antenna television (CATV), has come a long way from its humble beginning as a means of providing rural television reception. Presently, cable television is an important means of providing reception of local, non-local and premium television programs and promises to become an important means of providing many new, two-way (interactive) services in the future. Heretofore, cable television also promised a number of problems.

One such problem, even for one-way cable-television systems, is that of signal security. Many prior-art one-way cable-television systems transmit signals conveying premium television programs only to those who have made arrangements in advance (paid) for such programs. To restrict the reception of such programs, the signals conveying the programs are scrambled and those who have made arrangements to receive the programs are provided suitable descramblers. Unfortunately, such descramblers are relatively expensive. Further, it is difficult to securely scramble television signals, the redundant information in the signals making the signals relatively easy to descramble. Even for those who lack the requisite skills to build descramblers, such devices can often be purchased. For many two-way services, such as electronic mail, the signal security problem is evern more acute.

Another problem for two-way cable-television systems is that of noise. Noise, which typically enters at the drop cable level, must be prevented from propagating up the system (upstream) to disable the entire system.

A very serious problem is that of system loading. It is difficult to provide highly interactive services to a relatively large number of subscribers without so loading down prior-art-type two-way cable-television systems that the response time (delay) during peak hours becomes intolerable.

An interactive (two-way) cable-television system is disclosed in the U.S. Pat. No. 3,997,718 which issued to Ricketts et al. Disclosed is an interactive cable-television system employing a head-end subsystem, a plurality of subscriber units and a coaxial cable subsystem which interconnects the head-end subsystem with the various subscriber units. The system is operative to distribute television signals to the various subscriber units and to provide two-way digital data communications between the head-end subsystem and the various subscriber units. An encoder is employed in the head-end subsystem; and, a decoder is employed in each of the subscriber units, the combination for scrambling-/descrambling premium television signals to restrict the use thereof. Also employed is a mini-computer in the head-end subsystem and the combination of an alpha-numeric keyboard with alpha-numeric electronics in each of the subscriber units to operate with a subscriber's television as a data terminal for two-way digital data communications with the mini-computer. Two-way digital data communication is carried on synchronously with each subscriber unit being allocated a time slot in which to respond. Another system employing many of the same elements is disclosed in the U.S. Pat. No. 4,245,245 issued to Matsumoto et al.

A two-way cable-television system is disclosed in U.S. Pat. No. 3,750,022 which issued to Curry et al. Employed therein is a tree-type distribution subsystem having nodally disposed filters. Each of the filters responds to respective head-end subsystem generated commands to isolate noise developed on a respective coaxial cable (drop cable) leading to a corresponding subscriber unit(s).

Another two-way cable-television system employing a tree-type distribution network is disclosed in the U.S. Pat. No. 3,840,812 which issued to T. Takeuchi. The system employs a number of nodally disposed modulation units each for modulation by an alarm signal generated by one of a number of associated subscriber alarm transmitters. Not only does each of the modulation units operates upon a distinct carrier frequency; but, each of the alarm transmitters associated therewith also operates upon a distinct audio frequency. This permits a head-end subsystem to identify the origin of an alarm signal. The nodally disposed modulation units operate upon the alarm signals so as to permit a much larger number of subscriber transmitters to share the distribution network than would otherwise be possible.

Finally, a two-way cable-television system is disclosed by A. Bernhart in the U.S. Pat. No. 3,934,079 in which it is indicated that two-way digital communication is by means of synchronously generated data packets.

A data communication (time share) network is disclosed in the U.S. Pat. No. 4,156,798 issued to M. Doelz. The network employs a number of host processing systems each coupled by a communications network to a number of terminal devices. Each of the processing systems is interconnected with the other processing systems to share data. The communications network includes a plurality of two-part buffer storage memories, fan-out node devices, line-master exchange unit devices, line exchange unit devices, and terminal exchange unit devices, all connected in a complex tree-ring configuration. Communication between the host processing system and a terminal device is by means of data blocks, erroneous blocks being discarded by the respective terminal exchange unit.

Television-type infra-red remote control units are disclosed in the U.S. Pat. Nos. 4,231,031 and 4,156,810, which issued to Crother et al and S. Igarashi, respectively. Both units employ infra-red radiation. Crother et al disclose the use of infra-red pulse spacing to represent each bit of digital data. In the S. Igarashi disclosure, the infra-red pulse spacing represents a digital quantity (word), in this case the desired channel number.

SUMMARY OF THE PRESENT INVENTION

It is therefore a material object of the present invention to provide a novel two-way cable-television system which is sufficiently versatile so as to provide a relatively wide range of services to a relatively large number of subscribers without significant overload delays.

Another object of the present invention is to provide a two-way cable-television system having relatively high signal security.

Still another object of the present invention is to provide a two-way cable-television system which is relatively immune to noise.

Briefly, the preferred embodiment of the present invention employs a head-end computer and a head-end subsystem including a source of television program signals for distribution by the system, a cable-distribution subsystem including a plurality of corrective regenerators, a plurality of control processors and a plurality of subscriber subsystems each including a selection of standard and optical units chosen to provide a mixture of services as is appropriate to provide the desired services. Each of the corrective regenerators buffers and retransmits signals representing commands (entries) encoded in a packet format which are propagating (upstream) from a subscriber subsystem to the head-end subsystem. Signals representing improperly formatted packets are ignored by each of the corrective regenerators which also discards certain packet signals when overloaded. Each of the control processors, which interfaces a number of subscriber subsystems to the cable-distribution subsystem, includes a number of receivers each for conditioning a television program signal on a selected channel before coupling the signal to a respective subscriber-subsystem unit.

A material advantage of the present invention is its versatility.

Another advantage of the present invention is the ability it affords to provide a relatively wide range of services to a relatively large number of subscribers without significant overload problems.

These and other objects and advantages of the present invention will no doubt become apparent to those skilled in the art after having read the following detailed description of the preferred embodiment which is illustrated in the figure of the drawing.

IN THE DRAWING

FIG. 1 is a combined block diagram and perspective view showing a two-way cable-television system in accordance with the present invention.

DETAILED DESCRIPTION OF THE PREFERRED EMBODIMENT

Figure 1:
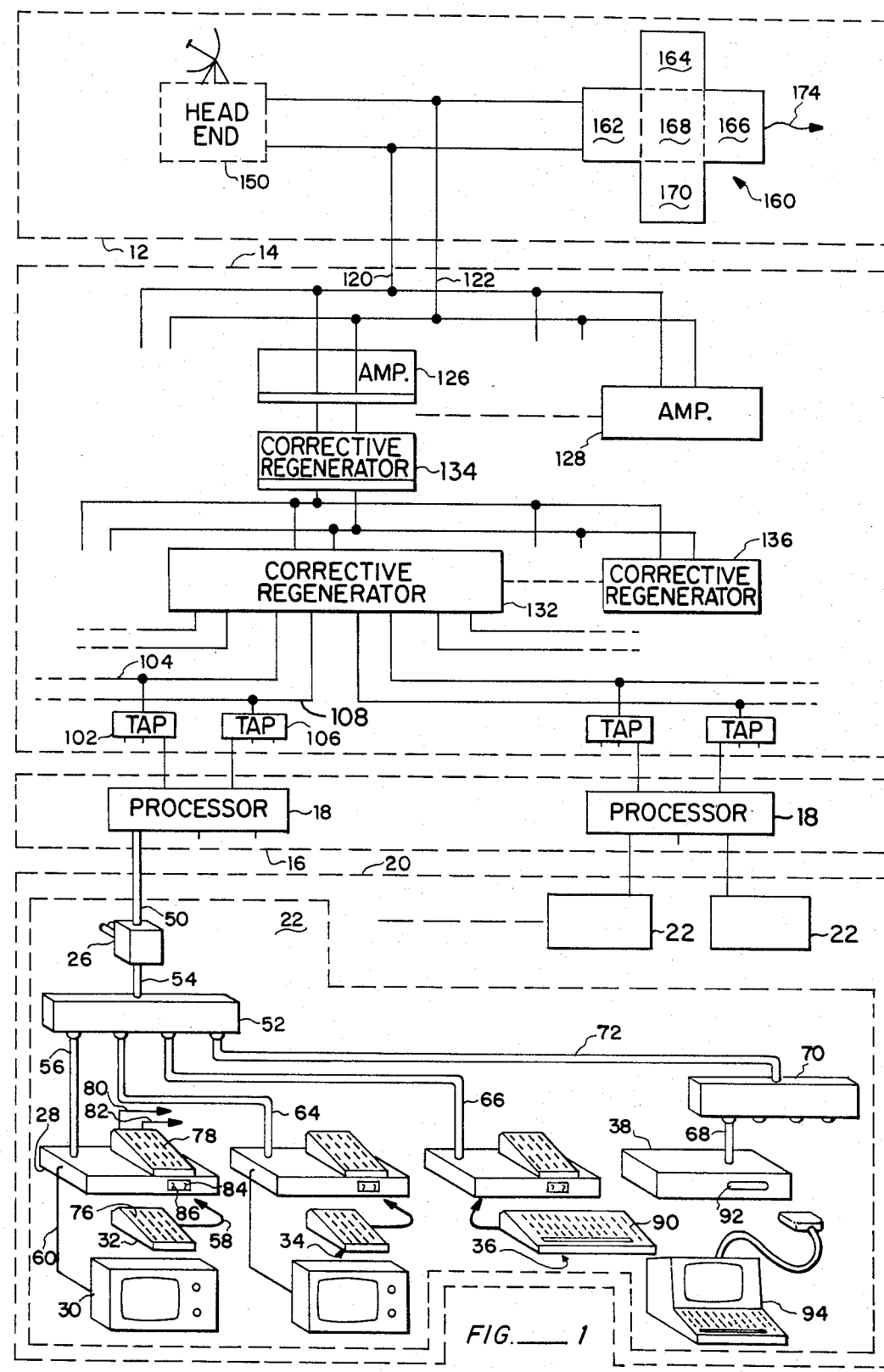

The preferred embodiment of a two-way (interactive) cable-television system in accordance with the present invention is shown in FIG. 1 generally designated by the number 10. Employed therein are a head-end subsystem 12, a cable-distribution subsystem 14, a plurality of control processors, collectively designated by the number 16 including a typical processor 18, and a plurality of subscriber subsystems, collectively designated by the number 20 including an illustrative subsystem 22. For clarity, the above-mentioned subsystems are described in order from the bottom up.

The components of subscriber subsystem 22 which are generally standard with all subscriber subsystems include a power-inserting unit 26, a set-top unit 28 for use with the respective subscriber's (conventional) television set 30 and a wireless remote-control unit 32. The remaining components of subscriber subsystem 22 each of which is optional with other subscriber subsystems include another set-top unit with an associated remote-control unit, collectively designated by the number 34, a keyboard unit 36 and a terminal unit 38. The above-mentioned units, as opposed to the associated control processor, are disposed at subscriber convenient locations within the respective subscriber's home (inside units).

Power-inserting unit 26 is connected to control processor 18 by means of a drop cable represented by a cable 50. Additionally, unit 26 is either directly connected to set-top unit 28 by means of a cable (not shown) or, in order to accommodate additional units, coupled thereto by means of one or more conventional signal splitters, represented by a splitter 52 which is connected to unit 26 by a cable 54 and to unit 28 by a cable 56. An infra-red beam (link) 58 couples remote-control unit 32 to set-top unit 28 which has provision for connection to television set 30 by means of a cable, represented by a cable 60. An illustrated, set-top unit 34 is connected to signal splitter 52 by a cable 64; and, keyboard unit 36 is coupled to the splitter by a cable 66. Finally, terminal unit 38 is shown coupled to signal splitter 52 by a cable 68, another signal splitter 70 and another cable 72.

From the bottom end up, remote control unit 32 has a keypad 76 for command entry, a microprocessor (not shown) for scanning the various keys of the keypad to detect each key closure, and an infra-red transmitter (also not shown) driven by the microprocessor so as to selectively develop beam 58 as necessary to transmit to set-top unit 32 the identity of each key upon the closure thereof. As used herein, the term "command" is intended to include all entries including requests for a particular service, data, etc. Keypad 76 includes keys for "panic" use.

Each of the set-top units, including unit 28, provides a means for limited command entry and a means for controlling an associated television set, such as set 30. Set-top unit 28 has a microprocessor with associated memory (not shown), a keypad 78, which is similar to keypad 76, an infra-red detector (also not shown), provision for connection to a home bus, represented by a line 80, provision for connection to a number of burglar-alarm and smoke-detector switches by a number of lines represented by a line 82, power-controlling and monitoring circuitry (not shown) and a pair of 7-segment display devices 84 and 86. The microprocessor scans the various keys of keypad 78 and monitors the infra-red detector to detect key closures from which the microprocessor assembles commands. Those commands which the microprocessor cannot execute directly are transmitted to control processor 18. Further, the microprocessor interfaces home bus 80 to the system and monitors the lines represented by line 82 to ascertain the status of each of the switches, notifying control processor 18 of changes therein. The microprocessor controls the AC power (on/off) coupled to television set 30 and monitors the power being consumed thereby, notifying control processor 18 of changes therein (set on/off). From information transmitted to set-top unit 28 by control processor 18, the unit microprocessor refreshes display devices 84 and 86 so as to display a number representing an associated television channel when the television set is in use or the time of day.

Set-top unit 28 executes commands transmitted thereto by control processor 18. The commands are transmitted to unit 28 encoded in a packet signal format. The individual binary bits of each packet are conveyed as amplitude modulation levels of individual cycles of a 8.056 Megahertz carrier signal which control processor 18 develops on cable 50.

Packet signals are also employed as a means for transmitting commands from set-top unit 28 to command processor 18. Individual bits of each packet are conveyed as amplitude modulation levels of respective cycles of a carrier signal which unit 28 develops on cable 56 by dividing in half the frequency of the 8.056

Megahertz carrier signal developed by control processor 18. Prior to transmitting a packet signal, unit 28 develops on cable 56 a request-to-send signal in the form of a constant-level signal at the half-8.056 Megahertz frequency. Upon receipt of a clear-to-send packet signal transmitted by control processor 18, set-top unit 28 transmits the packet signal and awaits an acknowledgement packet signal. Normally, a generally addressing clear-to-send packet signal is transmitted by control processor 18. When more than one unit of subscriber subsystem 22 attempts to transmit simultaneously, control processor 18 simply transmits a mute packet signal and then individually polls the units.

Additionally, set-top unit 28 has volume controlling circuitry (not shown) which receives a conventional television signal on a preset one of two special channels employed for transmitting television signals from the command processor to the associated unit. The circuitry demodulates the signal to develop a base-band video signal and a base-band audio signal. Next, as directed by the microprocessor, the circuitry attenuates the base-band audio signal to a subscriber selected level. Finally, the circuitry employs the base-band video signal and the attenuated audio signal to modulate suitable carrier signals so as to develop a conventional television signal on a preset one of the three channels two, three or four for driving television set 30.

Power-inserting unit 26 has a transformer (not shown) for connection to a conventional AC power line, the transformer for developing a 24 volt AC potential for powering control processor 18. In addition to coupling the AC potential to cable 50, power-inserting unit 26 couples between cables 50 and 52 the signals developed thereon including the packet signals and the special channel television signals.

Keyboard unit 36, which is similar to set-top unit 28, has a remote-control unit with a full keyboard 90, as opposed to the limited keypad of unit 32. The full keyboard is better suited for use in text processing and electronic mail handling.

Terminal unit 38 has a suitable connector 92 and a microprocessor with associated memory (not shown) for interfacing 110 through 19200, RS-232-type units to the system including a modem and a computer terminal, the latter being represented by a computer terminal 94. In interfacing computer terminal 94 to the system, terminal unit 38 converts various escape-sequence codes as might be employed by the particular type of terminal to the respective codes employed by the system.

Among other units which may be included with a subscriber subsystem are an alarm unit for interfacing additional burglar-alarm and smoke-detector switches to the system, a frame grabber unit for receiving and displaying on a subscriber's television set individual frames of a video picture, a video pick-up unit having a frame grabber, the combination for transmitting individual video frames and a game unit for downloading games to a subscriber's (conventional) video game.

Each of the control processors, including processor 18 is employed to interface up to eleven subscriber subsystems to cable distribution subsystem 14. Included in each processor are eleven frequency-agile digitally-tuned receivers (not shown) each for driving a respective set-top unit. Two receivers of control processor 18 are dedicated to subscriber subsystem 22, one for driving set-top unit 28 and the other for driving unit 34. Each receiver receives a signal on a selected one of a number of channels employed to transmit conventional television program signals on cable distribution subsystem 14 and converts the frequency of the signal to the special channel frequency appropriate for driving the respective set-top unit. Among the signals which may be selected are 50 plus channels of signals in the 55–400 Megahertz conventional cable television band transmitted on each of two cable subsystems including an "A" cable subsystem to which control processor 18 is coupled by a signal splitter (tap) 100 and a distribution cable 102 and a "B" cable subsystem, to which processor 18 is coupled by another signal splitter (tap) 104 and another distribution cable 106. The "A" and "B" cable subsystems are discussed below in connection with cable-distribution subsystem 14.

In addition to the above-mentioned receivers, each control processor, including processor 18, includes another receiver (not shown) for receiving commands which are transmitted by head-end subsystem 12 over cable distribution subsystem 14 on a one of four channels which are dedicated to this purpose.

Each of the control processors, including processor 18, transmits and receives commands encoded in a packet format. Individual bits of each of the packets which are transmitted over cable-distribution subsystem 14 are modified frequency modulation (MFM) encoded and conveyed as amplitude modulation levels of a carrier signal suitable for the respective channel employed therefore. The packets which are received by the various processors on a channel in the 55–400 Megahertz band dedicated to this purpose, are transmitted at a 2.014 Megabit rate; and, the packets, which are transmitted by the various processors on a channel of five channels which are below 35 Megahertz, are transmitted at a 1.007 Megabit rate. The packets are transmitted over the cable-distribution subsystem by a control processor beginning coincident with the beginning of an interval assigned to the respective processor, the interval being defined by an assigned three-line interval during each field of a conventional television signal. As previously indicated, the individual bits of packets which are transmitted between a control processor and one of the associated subscriber subsystems, such as between processor 18 and subsystem 22, are conveyed as amplitude modulation levels of a carrier signal. The carrier signal employed by each processor for transmitting packets has a 8.056 Megahertz frequency; and, the carrier signal employed by each subscriber-subsystem units for transmitting packets to the respective command processor has a frequency half the 8.056 Megahertz frequency.

Also included in each of the control processors, including processor 18, are a phase-locked loop, timing and display circuitry and microprocessor with associated memory (all not shown). From the MFM encoded signal, the phase-locked loop develops the 8.056 Megahertz carrier signal, four signals including a 32.2 Megahertz signal, a 16.1 Megahertz signal, a 10.7 Megahertz signal and a 8.05 Megahertz signal, one of which is employed as the carrier signal to transmit ackets to head-end subsystem 12, and a 32.2 Megahertz signal. Driven by the 32.2 Megahertz signal, the timing and display circuitry develops three conventional television signals each of which maps the contents of memory locations into corresponding elements of a television picture. The memory mapped signals are selectively coupled to various ones of the associated subscriber subsystems so as to display, on television set 30 for example, subscriber prompts and messages, electronic mail, requested view data and teletexed frames, billing information, bulletin board, shopping and banking text and the like.

Further, each control-processor microprocessor, encodes/decodes sensitive packets in accordance with the National Bureau of Standards DES algorithm.

Each of the control processors, including processor 18, maintains a subscriber authorization profile for each associated subscriber subsystem. Prior to providing a requested service, the respective control processor tests the request (command) against the respective subscriber authorization profile to ensure that the service is authorized for the particular subsystem. Thus, the subscriber authorization profiles provide a means of limiting services to certain classes of subscriber subsystems. For example, access to certain premium channels may require advance arrangements. Also, certain programs may be limited to certain professionals such as doctors. Additionally, a modesty code to be entered at a subscriber-subsystem unit before access to a particular channel may be included to permit parents to restrict the programs their children watch.

Upon initialization, and as is appropriate thereafter, each control processor, including processor 18, receives from head-end subsystem 12 by means of packet signals transmitted over cable-distribution subsystem 14 a series of instructions (software) for execution by the processor microprocessor, an assignment of the three-line interval coincident with the beginning of which the processor may begin transmission of a packet signal to the head-end subsystem and the respective subscriber authorization profiles. Responsive to status requests transmitted by head-end subsystem 12 once each minute, each control processor, including processor 18, polls its respective subscriber subsystem units, including unit 28, to obtain a status report which the processor transmits to the head-end subsystem. Each status report includes the operational status of the control processor and associated subscriber-subsystem units and the services being provided therethrough.

Cable-distribution subsystem 12 includes a pair of main trunk cables 120 and 122, a number of branch cables, a large number of distribution cables, including cables 104 and 108, a number of amplifiers represented by a pair of amplifiers 126 and 128 and a number of nested corrective regenerators represented by three regenerators 132, 134 and 136. As illustrated, corrective regenerator 132 is connected between a pair of branch cables 138 and 140 and the two distribution cables 104 and 108. The above-mentioned cables, amplifiers and corrective regenerators are connected in a pair of tree-type structures referred to as the "A" cable subsystem and the "B" cable subsystem. Each of the above-mentioned subsystems conducts signals in a 55-400 Megahertz band from head-end subsystem 12 (downstream) to each of the control processors, including processor 18, and forwards certain signals in the below 35 Megahertz band, signals which represent most properly formatted packets, from each of the command processors (upstream) to the head-end subsystem, as will become apparent shortly.

The amplifiers, including amplifiers 126 and 128, are employed so as to compensate for cable losses. Typically, one amplifier is employed for each half mile of cable. Each of the amplifiers amplifies signals in the 55-400 Megahertz band which are propagating from head-end subsystem 12 (downstream) to the various control processors, including processor 18, and amplifies signals in the below 35 Megahertz band which are propagating from the various control processors (upstream) to the head-end subsystem.

The principal difference between cable-distribution subsystem 14 and those of prior art design is that subsystem 14 includes corrective regenerators. Each corrective regenerator, including regenerator 132, has filters and a microprocessor with associated memory (all not shown). The filters pass signals in the 55-400 MHz band and trap (intercept) signals in the below 35 MHz band. The microprocessor and memory, buffer and retransmit intercepted signals which represent certain properly formatted packets propagating from each of the individual control processors, including processor 18, (upstream) to head-end subsystem 12. The principal characteristics of the corrective regenerators is that each regenerator ignores signals which do not represent properly formatted packets and, when overloaded, discards (ignores) certain signals which represent properly formatted packets so as to favor older commands, as will become apparent shortly.

Properly formatted packets propagating from a control processor (upstream) to the head-end subsystem have a header (8-bit) byte, a repeat flag bit, three carbon copy bits, a packet length bit and 35 address bits. Short packets (having a 16 octet format) also have a packet type byte, 7 data bytes and 2 CRC bytes. Long packets (having a 64 octet format) also have 2 placemark bits, 6 packet type bits, 55 data bytes and 2 CRC bytes.

Proper protocol requires that when a packet signal has successfully propagated (upstream) from a control processor, such as processor 18, through the various layers of corrective regenerators, in this case through regenerators 132 and 134, to head-end subsystem 12, that subsystem 12 acknowledge receipt of the packet signal. Upon failure to receive such an acknowledgement, because the packet signal has been destroyed due to collision with another packet signal or the packet signal has been discarded by a corrective regenerator, the respective control processor waits a random period of time within a deterministic time interval and retransmits the packet signal. The repeat flag bit and carbon copy number bits provide each corrective regenerator a means of ascertaining the age of the respective command and, thus, a means of prioritizing packet signals for discarding purposes.

The number of subscriber subsystems which may be accommodated in one system and, to accommodate the subsystems, the required number of control processors and corrective regenerators and nesting thereof, is a function of the peak loading generated by the service demand, the peak delay which will be tolerated in providing the services and the data rate.

It should be noted that by limiting the number of control processors which are connected to each corrective regenerator to 87 processors, each processor may be assigned a unique three-line interval for transmitting packet signals to the regenerator to avoid any probability of collision. Of course, some probability of collision is acceptable. A preferred embodiment employs 18,000 set-top units, including unit 22, 3,000 control processors, including processor 18, 40 corrective regenerators, including regenerator 132, and one head-end subsystem, subsystem 12. The preferred data rates are 1.007 Megabits per second per channel upstream and 2.014 Megabits per second per channel downstream. Where a substantially larger number of subscriber subsystems are to be accommodated, the preferred embodiment employs several systems, the head-end subsystems of which being interconnected as will become apparent shortly.

Head-end subsystem 12 includes a source of television program signals each for transmission on a respective channel of cable-distribution subsystem 14, the source being represented by a satellite earth station 150. Preferably, base-band television program signals are developed each of which is employed to directly drive a respective one of an array of transmitters to develop signals suitable for transmission over the cable-distribution subsystem. Alternatively, the base-band television program signals are coupled to the transmitter array by a signal switcher. The signal switcher interposes the channels upon which the television program signals are transmitted by interchanging signals when the syncronization portions thereof are in time coincidence.

More specifically, the signal switcher has 112 syncronization strippers each driven a respective one of the base-band program television signals to develop a signal which identifies the start of each frame thereof and 112 monostable multivibrators each driven by a respective one of the syncronization strippers to develop a series of constant-width pulses. Additionally, the signal switcher has an oscillator driven counter, eight 16-line-to-4-line multiplexers and a microprocessor. The counters and multiplexers are configured so as to couple in turn each of the multivibrators to an interrupt input of the microprocessor, each multivibrator being coupled to the microprocessor during a respective subinterval of each of a series of intervale delineated by the counter.

A carry output of the counter is connected to another input of the microprocessor to delineate the counter interval. Finally, the signal switcher has a microprocessor driven crossbar switch for interconnecting the various base-band television program signals and the various receivers of the receiver array. When the microprocessor is interrupted by two multivibrator generated pulses during any one counter delineated interval, the microprocessor causes the crossbar switch to interchange the corresponding base-band television signals, unless such an interchange has previously occurred within a predetermined interval.

Also included in head-end subsystem 12 is a head-end computer 160, which, for clarity, is shown divided into functional modules including a cable-interface module 162, a data-base module 164, a gate way module 166, components of the various modules are configured to prevent system failure due to the failure of any single computer component as will become apparent shortly.

Cable-interface module 162 has four combined transmitter-receivers, two (cable-interface module) local buses, two processors each controlling a respective one of the (cable-interface module) local buses and three quadraport memory modules (all not shown). Two of the transmitter-receivers are connected to main-trunk cable 120 of cable "A", the other two of the transmitter-receivers being connected to main-trunk cable 122 of cable "B". Each of the transmitter-receivers transmits packet signals on a respective channel in the 55-400 Megahertz band and receives packet signals on a respective channel in the under 35 Megahertz band. Further, each of the transmitter-receivers is connected to each of the (cable-interface module) local buses whereby each of the processors may provide packet signals for transmission over cable-distribution subsystem 14 and obtain packet signals transmitted over the cable-distribution subsystem. Each of the quadra-port memory modules is connected so as to be available to each of the processors on respective ones of the two (cable-interface module) local buses and to be available to each of a pair of processors on a respective one of a pair of buses local to system-control module 162.

Data-base module 164 has two (data-base module) local buses, two processors each controlling a respective one of the (data-base-module) local buses and three quadra-port memory modules each connected to be available to each of the processors on respective ones of the (data-base-module) local buses and to each of the two processors on respective ones of the system-control-module local buses. Additionally, data-base module 164 has three 60-Megabyte disc drives with associated disks, each drive being coupled by a respective disc interface module to each of the (data-base-module) local buses, two 65-Megabyte tape units each coupled by a respective tape interface module to each of the (data-base-module) local buses and two high-speed printers each coupled by an RS-232 interface module to each of the two (data-base-module) local buses.

Gateway module 166 has two (gateway module) local buses, two processors each controlling a respective one of the (gateway module) local buses and three quadra-port memory modules each connected to be available to each of the processors on a respective one of the (gateway-module) local buses and to each of the two processors on respective ones of the system-module-control local buses. Further, gateway module 166 has four RS-232-interface modules each connected to each of the (gateway-module) local buses, a 9600 baud modem and a 1200 baud modem, the two modems being driven by respective ones of two of the RS-232-interfaces. The modems and the other two RS-232 interface modules permit the system to be connected to external data bases and/or other cable-television systems to share data, the connection being represented by a line 174.

As previously indicated, system-control module 168 has two (system-control-module) local buses, two processors each controlling a respective one of the (system-control-module) local buses, three quadra-port memory modules which are shared with cable-interface module 160, three quadra-port memory modules which are shared with data-base module 164 and three quadra-port memory modules which are shared with gateway module 166.

Only one of the two processors of each of the modules operates at a time. Control is transferred between the two processors of each module on a periodic basis responsive to a processor-resetting signal having a period of one quarter of a second.

The operation of head-end subsystem 12, and the system generally, is illustrated by means of a typical transaction. It is assumed that a view data frame has been requested by means of a command (request) entered through remote-control unit 32. With the closure of each key of keypad 76, beam 58 is generated so as to transmit the identity of the respective key to set-top unit 28. Responsive thereto, set-top unit 28 assembles the requisite command and notifies control processor 18 that a command has been entered by developing on cable 56 a constant level (request-to-send) signal at the half-8.056 Megahertz frequency. Upon receiving a clear-to-send packet signal from control processor 18, set-top unit 28 transmits the command in packet signal format and awaits an acknowledgement packet signal.

At the beginning of the appropriate three-line interval, control processor 18 transmits the packet signal to corrective regenerator 132 which forwards the packet signal through the various layers of corrective regenerators to cable-interface module 162. Cable-interface module 162 transmits a soft acknowledge packet signal to temporarily inhibit control processor 18 from sending duplicate packet signals.

In turn, the command (request) is forwarded from cable-interface module 162 to system-control module 168 which forwards the request for the frame and a billing notation for the requested frame to data-base module 164. Data-base module 164 retrieves from the disc the requested frame which is forwarded to system-control module 168. Additionally, data-base module 168 stores the billing notation on the disc and, when the billing notation has been properly verified, so notifies system-control module 168. System-control module 168 transfers the requested frame to cable-interface module 162 for transmission to control processor 18 and instructs the module to transmit a hard acknowledge of the command (request) to the control processor. Finally, control processor 18 develops a conventional television signal to display on set 30 the requested frame and, responsive to the hard acknowledge packet signal, purges from its memory the command (request for the frame).

It is important to note that the system is relatively immune to noise. Noise entering, at say the level of drop cable 50, does not propagate upstream. The next higher level component, in this case command processor 18, ignores the noise since it does not represent a properly formatted packet. Also, when polled once each minute by head-end computer 60, command processor 18 indicates to the computer that there is a problem with subscriber subsystem 20.

Additionally, it should be noted sensitive packet signals travelling over cable-distribution subsystem 14 are encoded. Also, only requested and authorized channel signals are available at the drop cable level, such as on cable 50 for subscriber subsystem 20. Further, to reduce the accessibility of premium television signals being transmitted over cable-distribution subsystem 14, the channel assignments of these signals may be periodically (randomly) changed with each of the command processors being notified of the changes (supplied mappings) so that the associated receivers may track the signals.

It is contemplated that after having read the preceding disclosure certain alterations and modifications of the present invention will no doubt become apparent to those skilled in the art. It is therefore intended that the following claims be interpreted to cover all such alterations and modifications as fall within the true spirit and scope of the invention.

We claim:

1. A tree-type two-way data communications system for use in a cable televison system having a single head-end subsystem, a plurality of data sources and a cable television distribution network wherein each said data source is a source of digital commands to said head-end subsystem, said two-way system comprising:
    a plurality of interface subsystems intermediate of said head-end subsystem and each one of said data sources, said interface subsystems being coupled in a tree structure to said head-end subsystem, each one of said data sources being coupled to one of said interface subsystems, and each one of said interface subsystems being coupled to at least one other of said interface subsystems, said interface subsystems receiving without acknowledgment through said cable distribution network from at least one of said data sources said digital command signals, each said interface subsystem verifying data for mat and regenerating and forwarding at least some of said digital commands as command packet signals in a packet signal format on an uplinked carrier towards said head-end subsystem;
    said head-end subsystems receiving said digital command signals as said command packet signals and developing response signals; and
    said cable-distribution subsystem coupling response signals in a tree-structure without loops from said head-end subsystems to each one of said data sources through a common signal path independent of said uplink for acknowledging receipt of said command packet signals.

2. In a communication system according to claim 1 wherein each said interface subsystem comprises a corrective regenerator means, said corrective regenerator means for forwarding verified command packet signals toward said head-end subsystem and further to reject selected current ones of said command packet signals in favor of prior ones of said command packet signals when said corrective regenerator means is overloaded with signal processing tasks.

3. In a communications system according to claim 2 further including means for developing at least one television type signal in response to a selected command signal and means for selectively coupling said televison type signal to a display device associated with the said data source associated with said selected command signal in replacement of another television type signal.

4. In a two-way communications system according to claim 2, further characterized in that said data sources are a plurality of subscriber subsystems and command processor means;
    that each subscriber subsystem includes means for entering a control command and for generating said digital command signals and means for coupling a television signal on a preset channel to a television set subsystem; that
    said head-end subsystem further includes means for receiving cable channel signals from a cable channel signal source; that
    a plurality of subscriber subsystems are coupled to a single command processor means; and that
    a plurality of command processor means are coupled to one of said corrective, regenerators, each command processor means monitoring for acknowledgment of receipt of said command packet signals from said head-end subsystem and retransmitting unacknowledged command packet signals through a plurality of said corrective regenerators after a random period of time within a deterministic time interval indicative of failure to receive said achkowledgement.

* * * * *